United States Patent
Oppelt

(10) Patent No.: US 10,683,641 B2
(45) Date of Patent: Jun. 16, 2020

(54) DEPTH GUIDANCE SYSTEM FOR A WORK VEHICLE

(71) Applicant: Deere & Company, Moline, IL (US)

(72) Inventor: Benjamin J. Oppelt, Dubuque, IA (US)

(73) Assignee: Deere & Company, Moline, IL (US)

( * ) Notice: Subject to any disclaimer, the term of this patent is extended or adjusted under 35 U.S.C. 154(b) by 23 days.

(21) Appl. No.: 16/032,218

(22) Filed: Jul. 11, 2018

(65) Prior Publication Data

US 2020/0018048 A1 Jan. 16, 2020

(51) Int. Cl.
*E02F 9/26* (2006.01)
*G08B 5/36* (2006.01)
*G08B 21/18* (2006.01)

(52) U.S. Cl.
CPC .............. *E02F 9/264* (2013.01); *G08B 5/36* (2013.01); *G08B 21/182* (2013.01); *B60Y 2200/412* (2013.01)

(58) Field of Classification Search
CPC ... E02F 9/26; E02F 9/264; G08B 5/36; G08B 21/182; B60Y 2200/412
USPC ............................. 701/50; 340/679, 680, 684
See application file for complete search history.

(56) References Cited

U.S. PATENT DOCUMENTS

| | | | | |
|---|---|---|---|---|
| 4,413,684 A * | 11/1983 | Duncklee | .............. | E02F 3/7672 172/12 |
| 4,888,890 A * | 12/1989 | Studebaker | ............. | E02F 3/437 37/348 |
| 6,665,067 B2 * | 12/2003 | Ogawa | .................... | E02F 3/437 356/247 |
| 8,817,238 B2 * | 8/2014 | Montgomery | ......... | G01C 21/04 356/3 |
| 2014/0375814 A1 * | 12/2014 | Ishimoto | .................. | B60R 1/00 348/148 |
| 2015/0282346 A1 * | 10/2015 | Ganim | ................. | H05K 5/0204 361/807 |

(Continued)

OTHER PUBLICATIONS

"In-cab Controls Enable 'Smart' Excavator Technology", Equipment Today, <https://www.forconstructionpros.com/equipment/earthmoving/excavators/article/20985866/incab-controls-enable-smart-excavator-technology> (accessed Jun. 26, 2018).

(Continued)

*Primary Examiner* — Isaac G Smith
(74) *Attorney, Agent, or Firm* — Kilpatrick Townsend & Stockton LLP

(57) ABSTRACT

A depth guidance system for a work vehicle can be provided. In one example, the depth guidance system can include a depth sensor for detecting a depth of a work tool coupled to the work vehicle. The depth guidance system can include a first indicator light configured to illuminate in a first color indicating that the work tool is above a target depth-range. The depth guidance system can also include a second indicator light configured to illuminate in a second color indicating that the work tool is within the target depth-range. The depth guidance system can receive sensor signals from the depth sensor indicating that the work tool is at various depths and responsively activate a corresponding one of the first indicator light or the second indicator light for each depth among the various depths of the work tool.

22 Claims, 4 Drawing Sheets

(56) References Cited

U.S. PATENT DOCUMENTS

2016/0017571 A1* 1/2016 Paull ................... E02F 9/2228
701/50

OTHER PUBLICATIONS

"Rock Structures Speeds Basement and Utility Excavation by 50% with Trimble Earthworks Grade Control Platform", Trimble, <https://construction.trimble.com/customer-stories/rock-structures-speeds-basement-and-utility-excavation-50-trimble-earthworks-grade> (accessed Jun. 26, 2018).

* cited by examiner

DEPTH GUIDANCE SYSTEM FOR A WORK VEHICLE

TECHNICAL FIELD

The present disclosure relates generally to devices for use in construction operations. More specifically, but not by way of limitation, this disclosure relates to a depth guidance system for a work vehicle.

BACKGROUND

An excavator can have a bucket that an operator can manipulate to perform a variety of construction operations. But as the operator manipulates the bucket, the operator's view of the bucket may become obstructed or limited. For example, as the operator lowers the bucket into a hole, the operator's field of view may become obstructed by an edge of the hole. This can make it difficult for the operator to know how deep the bucket is within the hole.

SUMMARY

One example of the present disclosure includes a depth guidance system for a work vehicle. The depth guidance system can include a depth sensor configured to detect a depth of a work tool coupled to the work vehicle. The depth guidance system can include a first indicator light configured to illuminate in a first color indicating that the work tool is above a target depth-range. The depth guidance system can include a second indicator light configured to illuminate in a second color indicating that the work tool is within the target depth-range, the second color being different from the first color. The depth guidance system can include a third indicator light configured to illuminate in a third color indicating that the work tool is beneath the target depth-range, the third color being different from the first color and the second color. The depth guidance system can include a processing device communicatively coupled to the depth sensor, the first indicator light, the second indicator light, and the third indicator light. And the depth guidance system can include a memory device that includes instructions executable by the processing device for causing the processing device to receive sensor signals from the depth sensor indicating that the work tool is at various depths and responsively activate a corresponding one of the first indicator light, the second indicator light, or the third indicator light for each depth among the various depths of the work tool.

Another example of the present disclosure includes a work vehicle that has a cab defined by a frame that includes a plurality of vertical support members for supporting a roof of the cab. The work vehicle can also include a light bar coupled to a vertical support member among the plurality of vertical support members defining the frame of the cab. The light bar can include a first indicator light configured to illuminate in a first color. The light bar can also include a second indicator light configured to illuminate in a second color that is different from the first color. The work vehicle can also include a work tool configured to be manipulated using one or more input devices within the cab. The work vehicle can include a depth sensor configured to detect a depth of a work tool, and a processing device communicatively coupled to the depth sensor and the light bar. The work vehicle can further include a memory device that includes instructions executable by the processing device for causing the processing device to perform operations. The operations can include some or all of receiving a first sensor signal from the depth sensor; determining that the work tool is positioned above a target depth-range based on the first sensor signal and responsively activating the first indicator light; receiving a second sensor signal from the depth sensor; and determining that the work tool is positioned within the target depth-range based on the second sensor signal and responsively activating the second indicator light.

Another example of the present disclosure includes a method involving receiving a first sensor signal from a depth sensor configured to detect a depth of a work tool coupled to a work vehicle. The method can also involve determining that the work tool is positioned above a target depth-range based on the first sensor signal and responsively activate a first indicator light of a depth guidance system. The first indicator light can illuminate in a first color indicating that the work tool is above the target depth-range. The method can also involve receiving a second sensor signal from the depth sensor. And the method can involve determining that the work tool is positioned within the target depth-range based on the second sensor signal and responsively activate a second indicator light of the depth guidance system. The second indicator light can illuminate in a second color indicating that the work tool is within the target depth-range, where the second color is different from the first color. Some or all of these steps can be implemented by a processing device.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

DETAILED DESCRIPTION

Certain aspects and features of the present disclosure relate to a depth guidance system for a work tool of a work vehicle. The depth guidance system includes a depth sensor and a visual display device. The depth guidance system can detect the depth of the work tool using the depth sensor and activate the visual display device accordingly to provide depth-guidance information to an operator of the work vehicle. In some examples, the visual display device includes at least three indicator lights that illuminate in different colors. For example, the visual display device can include a first indicator light that illuminates yellow, a second indicator light that illuminates green, and a third indicator light that illuminates red. The depth guidance system can activate the first indicator light if the work tool is above a target-depth range to notify the operator that the work tool is approaching the target-depth range. The depth guidance system can activate the second indicator light if the work tool is within the target-depth range to notify the operator that the work tool has reached the target-depth range. The depth guidance system can activate the third indicator light if the work tool is below the target-depth range to notify the operator that the work tool has surpassed the target-depth range. This can provide quick, intuitive, and visually pleasing depth-guidance information to the operator of the work vehicle.

In some examples, the visual display device is coupled to a vertical support member (e.g., an "A-Pillar") of the work vehicle's cab. Positioning the visual display device at this location can enable the operator to view the visual display device using his peripheral vision while looking through the cab's front window to control the work tool. This can improve visibility by enabling the operator to see the depth-guidance information with his peripheral vision while continuing to look forward at the work tool during construction operations. This can also reduce eye strain resulting from the operator repeatedly refocusing his eyes between the farther-away work tool and a closer source of depth-guidance information, such as a touch-screen display with textual depth-guidance information in the cab.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
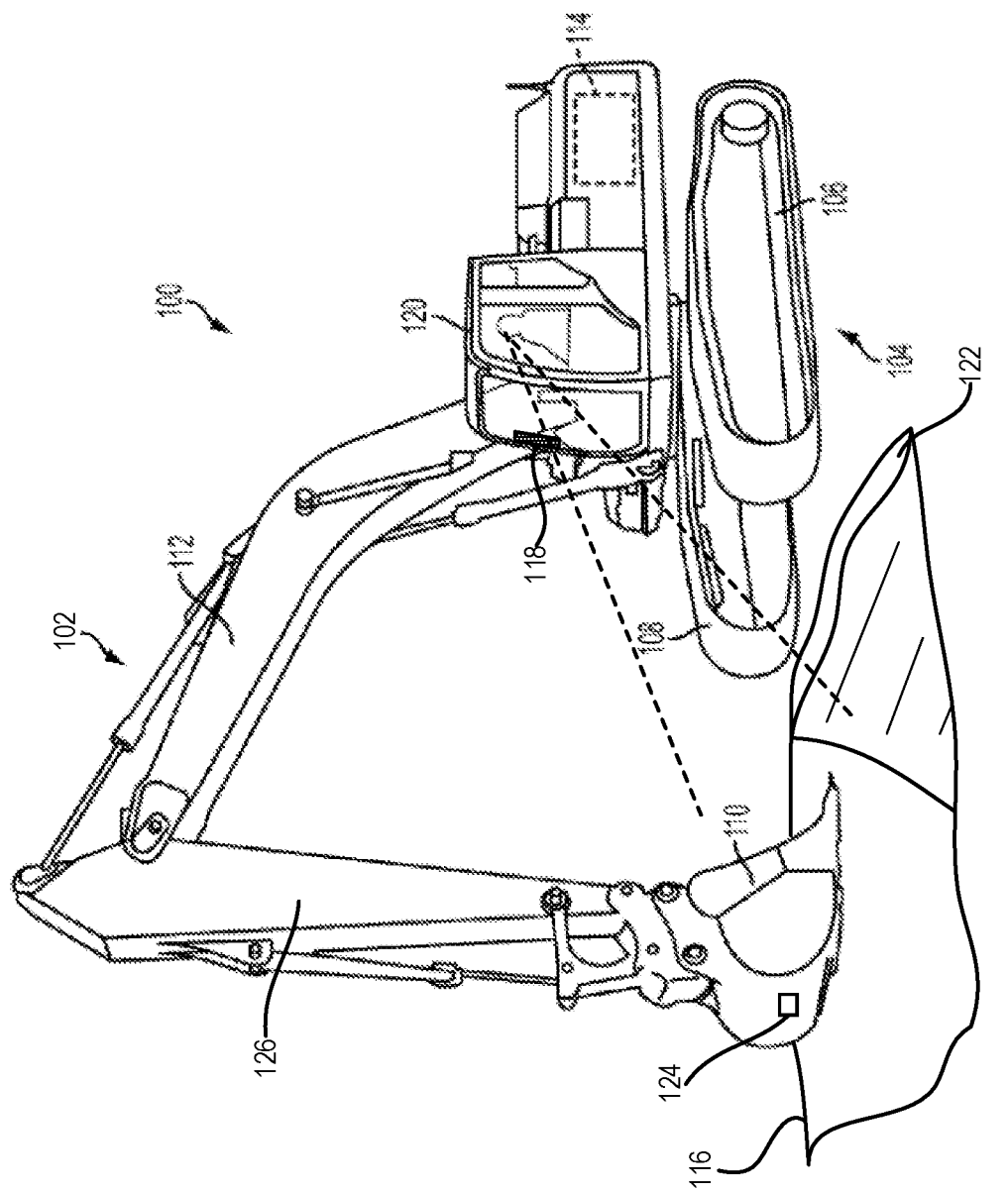
FIG. 1 is a perspective view of a work vehicle with a depth guidance system according to some aspects of the present disclosure.

FIG. 1 is a perspective view of a work vehicle 100 with a depth guidance system according to one aspect of the present disclosure. In this example, the work vehicle 100 is an excavator. But other examples can involve other types of work vehicles, such as trucks, backhoe loaders, bulldozers, harvesters, or pavers.

The work vehicle 100 includes a cab 120 that is structurally defined by a frame that includes at least two vertical support members for supporting a roof of the cab 120. The cab 120 can include a control system for operating various aspects of the work vehicle 100. The control system can include one or more levers, wheels, knobs, buttons, pedals, joysticks, or other user input devices.

The work vehicle 100 also includes an undercarriage positioned beneath the cab 120. The undercarriage includes a movement device 104 for providing mobility to the work vehicle 100. In the example shown in FIG. 1, the movement device 104 is a track system with a left track 106 and a right track 108. But the movement device 104 can include any number and combination of wheels or tracks.

The movement device 104 is controlled by an engine 114. For example, the engine 114 can provide the to move a track of the movement device 104. The engine 114 can be controlled by the control system in the cab 120. For example, an operator can use the control system to operate the engine 114 in order to move the work vehicle 100 in one or more directions.

The work vehicle 100 further includes a work unit 102 for performing one or more construction operations (e.g., digging, shearing, pulling, or pushing) at a construction site. In some examples, the work unit 102 can include a boom 112 positioned adjacent to or in front of the cab 120. The boom 112 can be manipulated by one or more hydraulic cylinders, which in turn can be controlled by the control system in the cab 120. The work unit 102 can also include an arm 126 (e.g., a dipper stick) coupled to the boom 112. The arm 126 can also be manipulated by one or more hydraulic cylinders, which in turn can be controlled by the control system in the cab 120. In some examples, the work unit 102 further includes a work tool 110 coupled to an end of the boom 112 or arm 126. Example of the work tool 110 can include a bucket, grapple, auger, ripper, compactor, hammer, shear, or other attachment for performing one or more construction operations. The work tool 110 can also be manipulated by one or more hydraulic cylinders, which in turn can be controlled by the control system in the cab 120.

As an operator manipulates the work tool 110 via the control system, the operator's view of the work tool 110 may become obstructed or limited. For example, as the operator lowers the work tool 110 into a hole 116, the operator's field of view (e.g., as indicated by dashed lines) may become obstructed by an edge 122 of the hole 116. Some examples of the present disclosure can overcome this issue by providing a depth guidance system that enables the operator to monitor the depth of the work tool 110, even if the work tool 110 is not visible to the operator.

The depth guidance system can have depth sensor 124, which in FIG. 1 is coupled to the work tool 110 but can be positioned elsewhere on the work vehicle 100 in other examples. The depth guidance system can also include a visual display device 118. The visual display device 118 can be positioned within the cab 120 or elsewhere on the work vehicle 100 (e.g., on the boom 112 or arm 126). The depth guidance system can use the depth sensor 124 to detect the depth of the work tool 110 and operate the visual display device 118 to provide depth-guidance information to the operator. This is discussed in greater detail below with respect to FIGS. 2-4.

Figure 2:
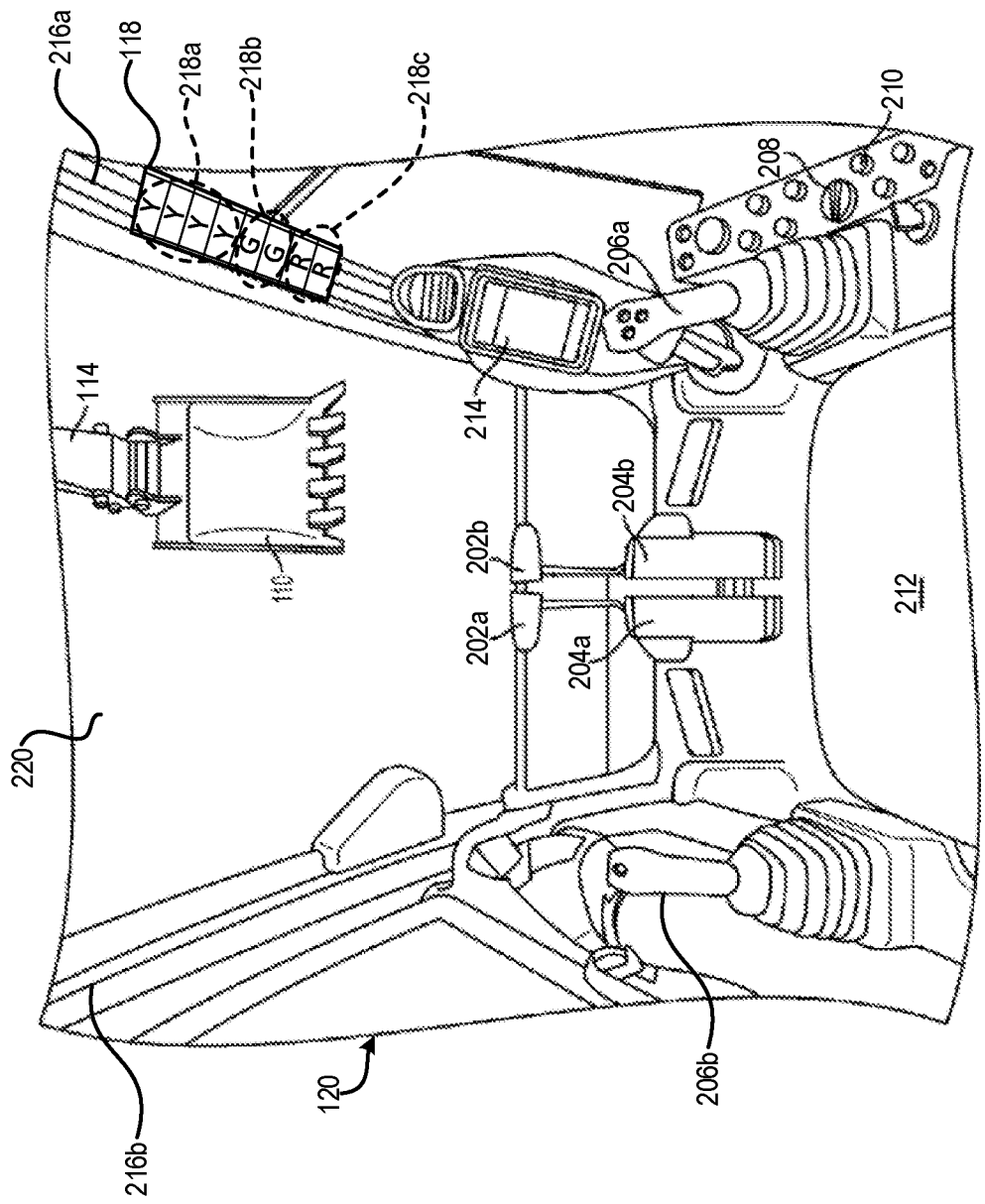
FIG. 2 is a perspective view of work vehicle's cab interior according to some aspects of the present disclosure.

An example of the cab's interior with the visual display device 118 is shown in FIG. 2. As shown, the cab 120 includes various user input devices, such as left- and right-foot pedals 204a-b for controlling movement of the work vehicle, left- and right-hand controls 202a-b for additionally or alternatively controlling movement of the work vehicle, a speed input 208 for controlling the speed of the work vehicle, a mode selector 210 for selecting between various operating modes of the work vehicle, left- and right-joysticks 206a-b for controlling the work unit and the work tool, and a touch-screen display 214. The touch-screen display 214 can visually indicate various operating conditions of the work vehicle and receive user input.

The structure of the cab 120 is defined in part by a left vertical-support member 216b and a right vertical-support member 216a. These vertical support members 216a-b are often referred to as "A-Pillars." There may also be additional vertical and horizontal support members defining the structure of the cab 120, but these are not shown in FIG. 2 for simplicity.

Within the cab 120 is the visual display device 118 of the depth guidance system. The visual display device 118 can be coupled to one of the vertical-support members 216a-b and oriented toward the cab's seat 212 so as to be visible to the operator of the work vehicle. Positioning the visual display device 118 in this manner can enable the operator to view the visual display device 118 using his peripheral vision as he looks through the front window 220 to manipulate the work tool 110. This can improve visibility by enabling the operator to continue to look forward at the work tool 110 during construction operations, as opposed to having to look away from the work tool 110 to view another source of depth-guidance information, such as the touch-screen display 214. This can also reduce the eye strain that typically results from repeatedly refocusing one's eyes between a farther away object (e.g., the work tool 110) and a closer object (e.g., the touch-screen display 214) to view the depth-guidance information.

The visual display device 118 can include two or more indicator lights 218a-c for providing guidance information to the operator about the depth of the work tool 110. Each of the indicator lights 218a-c can illuminate in a different color to provide information about the depth of the work tool 110. For example, the user can input a target-depth range via one of the user input devices in the cab 120. The depth guidance system can determine that the work tool 110 is approaching the target depth-range and responsively activate indicator light 218a, which can illuminate yellow to indicate that the work tool 110 is approaching the target depth-range. The depth guidance system can additionally or alternatively determine that the work tool 110 is within the target depth-range and responsively activate indicator light 218b, which can illuminate green to indicate that the work tool 110 is within the target depth-range. The depth guidance system can additionally or alternatively determine that the work tool 110 has surpassed the target depth-range and responsively activate indicator light 218c, which can illuminate red to indicate that the work tool 110 has surpassed the target depth-range. These colored lights can provide visual cues about the spatial positioning of the work tool that can be easier and faster for the operator to cognitively process than other types of information, such as textual information. While the above example involves the colors yellow, green, and red, other color combinations are possible.

The indicator lights 218a-c can each include one or more light segments. For example, in FIG. 2, the indicator light 218a includes four light segments that can be sequentially illuminated by the depth guidance system as the work tool 110 approaches the target depth-range. As another example, the indicator light 218b includes two light segments that can be sequentially illuminated by the depth guidance system as the work tool 110 moves deeper within the target depth-range. As yet another example, the indicator light 218c includes two light segments that can be sequentially illuminated by the depth guidance system as the work tool 110 moves deeper beyond the target depth-range. The indicator lights 218a-c can have any number and combination of light segments, which can be illuminated by the depth guidance system at any number and combination of work-tool depths.

In some examples, each of the indicator lights 218a-c can be at least 0.0508 m in height ensure that the indicator lights 218a-c are suitably visible in the operator's peripheral vision (e.g., without causing eye strain). And each of the indicator lights 218a-c can be no more than 0.0762 m wide to prevent the indicator lights 218a-c from visually obstructing the operator's view out of the front window 220.

In some examples, the depth guidance system can adjust the brightness of the indicator lights 218a-c. This may help prevent eye strain when working at night or to improve visibility when working in a bright setting. For example, the operator can manipulate a user input device in the cab 120, which can cause the depth guidance system to adjust the amount of power supplied to the indicator lights 218a-c, thereby increasing or decreasing the brightness of the indicator lights 218a-c accordingly. As another example, the depth guidance system can include an ambient light sensor. The depth guidance system can use the ambient light sensor to detect the amount of ambient light and automatically adjust the brightness of the indicator lights 218a-c accordingly.

Figure 3:
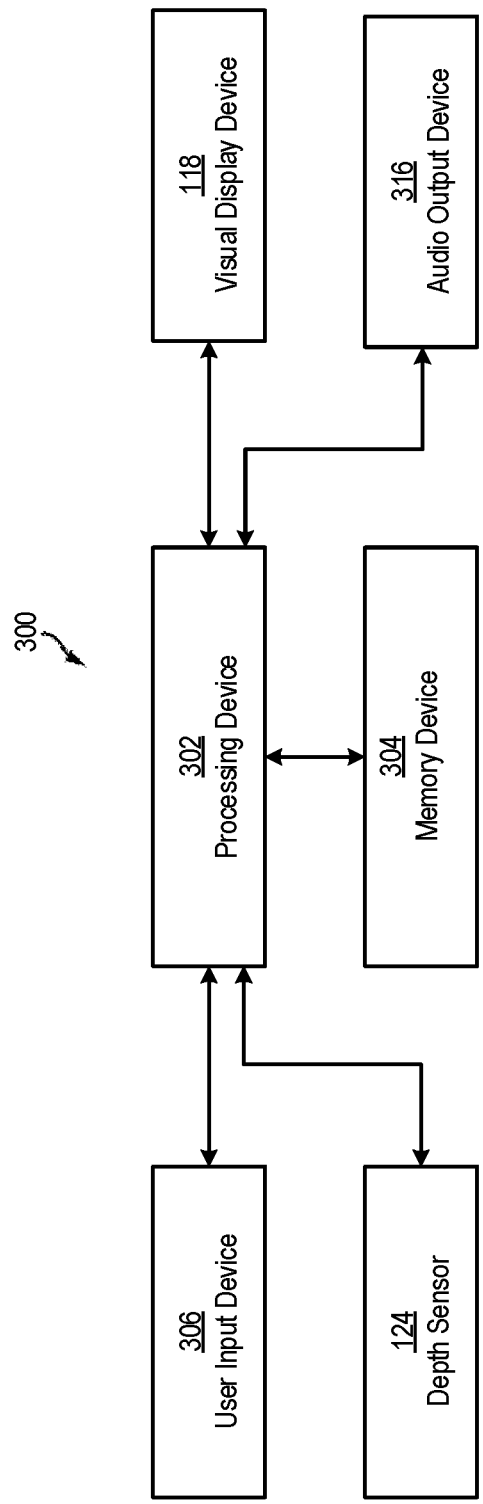
FIG. 3 is a block diagram of a depth guidance system according to some aspects of the present disclosure.

One example of the depth guidance system 300 is shown in FIG. 3. The depth guidance system 300 includes a processing device 302 communicatively coupled with a memory device 304. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions stored in the memory device 304 to perform operations. In some examples, the instructions can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions. A computer-readable medium can include electronic, optical, magnetic, or other storage devices capable of providing the processing device 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions.

The processing device 302 is also communicatively coupled to a user input device 306. The user input device 306 can include one user input device or multiple user input devices. The user input device 306 can be positioned anywhere in the cab of the work vehicle for receiving user input and transmitting an input signal indicating the user input to the processing device 302. Examples of the user input device 306 can include a button, switch, touch-screen display, touch-pad, pedal, or joystick.

The processing device 302 is further communicatively coupled to the depth sensor 124 and the visual display device 118. The depth sensor 124 can include one depth sensor or multiple depth sensors. The depth sensor 124 can be positioned on anywhere on a work unit or elsewhere on the work vehicle. The depth sensor 124 can detect the depth of the work tool (e.g., relative to a fixed position in real space, such as a ground plane) and transmit a sensor signal indicating the depth of the work tool to the processing device 302. Examples of the depth sensor 124 can include a camera or an ultrasonic transducer.

The processing device 302 can receive one or more sensor signals from the depth sensor 124 and, based on the one or more sensor signals, activate the visual display device 118 accordingly. For example, the processing device 302 can receive a first sensor signal from the depth sensor 124, determine that the work tool is positioned above the target depth-range based on the first sensor signal, and responsively activate a first indicator light of the visual display device 118. As another example, the processing device 302 can receive a second sensor signal from the depth sensor 124, determine that the work tool is positioned within the target depth-range based on the second sensor signal, and responsively activate a second indicator light of the visual display device 118. As yet another example, the processing device 302 can receive a third sensor signal from the depth sensor 124, determine that the work tool is positioned below the target depth-range based on the third sensor signal, and responsively activate a third indicator light of the visual display device 118. While the above examples involve the visual display device 118 being a light bar with multiple indicator lights, in other examples the visual display device 118 can be another type of display device, such as a computer monitor or touch-screen display. In some such examples, the processing device 302 may generate a graphical user interface with different color visual-segments (e.g., yellow, green, and red segments) to visually mimic the functionality of the indicator lights discussed above.

In some examples, the processing device 302 is also coupled to an audio output device 316, such as a speaker or buzzer. The audio output device 316 can include one audio output device or multiple audio output devices. The processing device 302 can activate the audio output device 316 in response to various work-tool conditions, for example, in response to the work tool being at a certain depth. For example, processing device 302 can transmit an electrical signal to the audio output device 316 in response to detecting that the work tool has passed the target depth-range. This can cause the audio output device 316 to provide an auditory alert to the operator.

Figure 4:
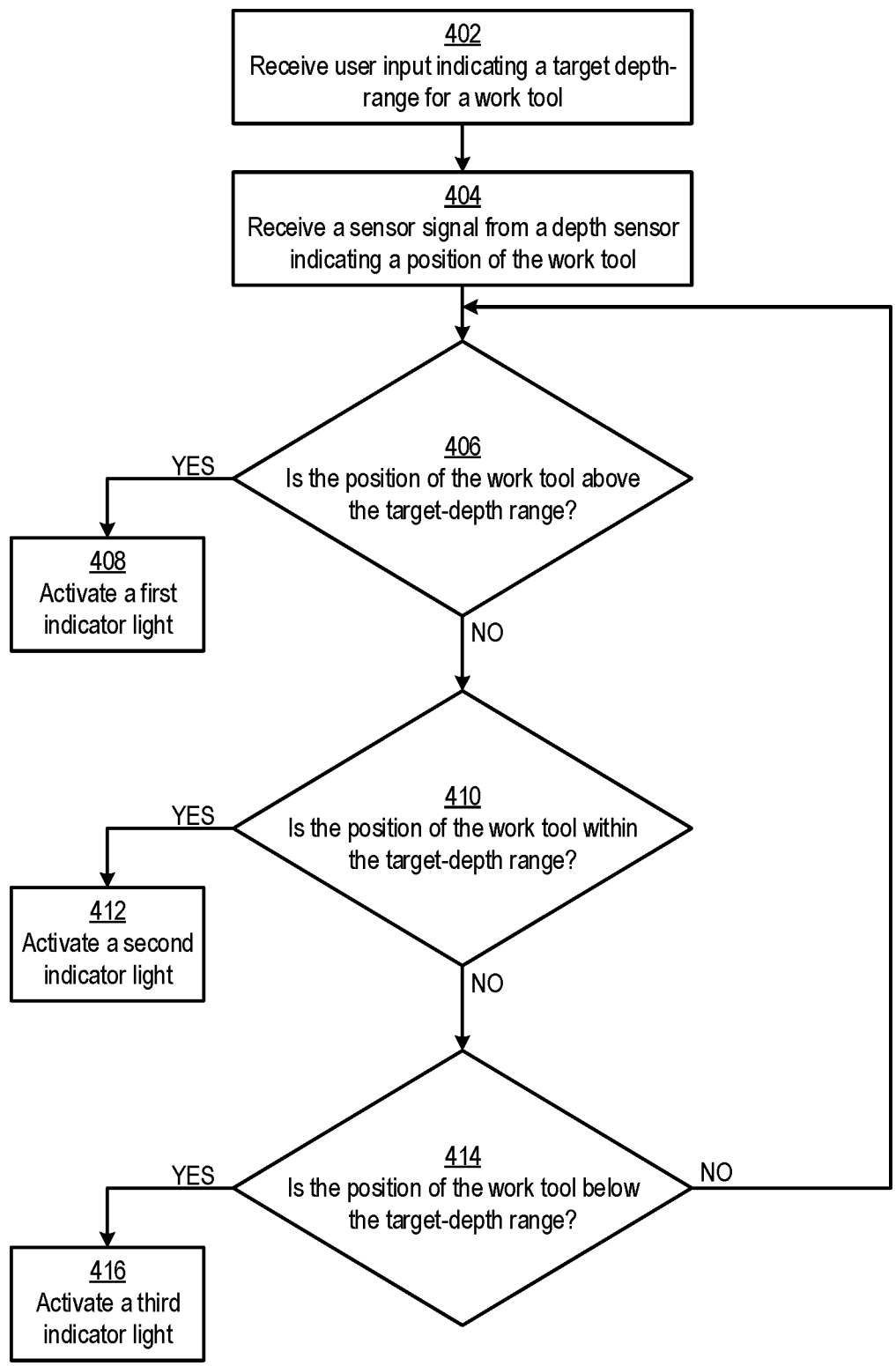
FIG. 4 is flow chart of an example of a process for depth guidance according to some aspects of the present disclosure.

In some examples, the processing device 302 can implement the steps shown in FIG. 4 to provide depth guidance. Other examples can include more steps, fewer steps, different steps, or a different combination of steps than are shown in FIG. 4. The steps of FIG. 4 are discussed below with reference to the components discussed above in relation to FIG. 3.

In block 402, the processing device 302 receives user input indicating a target depth-range for a work tool of a work vehicle. In other examples, the processing device 302 can receive user input indicating a target depth for the wok tool and determine the target depth-range based on the target depth. For example, the processing device 302 can receive user input indicating that the target depth for the work tool is 3 meters (m). The processing device 302 can then apply a default tolerance of 0.5 m to either side of the target depth to calculate the target depth-range. For example, the processing device 302 can subtract a half meter from the target depth to determine an upper boundary of 2.5 m for the target depth-range. And the processing device 302 can add a half meter to the target depth to determine a lower boundary of 3.5 m for the target depth-range. Other examples can involve other default-tolerances, user-provided tolerances, or other processes for determining the target depth-range based on the target depth.

In block 404, the processing device 302 receives a sensor signal from a depth sensor 124 configured to detect a depth of the work tool. In some examples, the sensor signal can include multiple sensor signals from multiple depth sensors (e.g., received concurrently). For example, the processing device 302 can receive multiple images of the work tool from multiple cameras arranged on the work vehicle in a particular spatial configuration to enable the processing device 302 to perform triangulation or another image-processing technique on the images, and thereby determine the depth of the work tool.

In other examples, the depth sensor 124 can detect a reflected signal off a surface (e.g., the bottom of a hole in the ground) and transmit a sensor signal associated with the reflected signal to the processing device 302. For example, the processing device 302 can use an ultrasonic transducer (e.g., positioned on the work tool) to transmit an ultrasonic wave toward the surface. The processing device 302 can then detect a reflection of the ultrasonic wave off the surface using the depth sensor 124, and calculate the roundtrip time between when the ultrasonic wave was transmitted and when the reflection was received. The processing device 302 can use the roundtrip time to determine the depth of the work tool.

In block 406, the processing device 302 determines if the work tool is positioned above a target depth-range based on the sensor signal. The processing device 302 can determine whether the work tool is positioned above the target depth-range by comparing the depth of the work tool to the target depth-range. If the processing device 302 determines that the work tool is positioned above the target depth-range, the process can continue to block 408, in which the processing device 302 activates a first indicator light of the visual display device 118. Otherwise, the process can continue to block 410.

In block 410, the processing device 302 determines if the work tool is positioned within the target depth-range based on the sensor signal. If the processing device 302 determines that the work tool is positioned within the target depth-range, the process can continue to block 412, in which the processing device 302 activates a second indicator light of the visual display device 118. Otherwise, the process can continue to block 414.

In block 414, the processing device 302 determines if the work tool is positioned below the target depth-range based on the sensor signal. If the processing device 302 determines that the work tool is positioned below the target depth-range, the process can continue to block 416, in which the processing device 302 activates a third indicator light of the visual display device 118. Otherwise, an error likely occurred and the process can return to block 406.

Blocks 404-416 can be repeated any number of times for any number and combination of sensor signals from the depth sensor 124. For example, these blocks can be iterated in substantially real-time as the work tool moves, thereby providing substantially real-time visual cues to the operator of the work vehicle about the spatial positioning of the work tool.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield additional examples.

The invention claimed is:

1. A depth guidance system for a work vehicle, the depth guidance system comprising:
   a depth sensor configured to detect a depth of a work tool coupled to the work vehicle;
   a first indicator light configured to illuminate in a first color indicating that the work tool is above a target depth-range;
   a second indicator light configured to illuminate in a second color indicating that the work tool is within the target depth-range, the second color being different from the first color;
   a third indicator light configured to illuminate in a third color indicating that the work tool is beneath the target depth-range, the third color being different from the first color and the second color;

an ambient light sensor;
a processing device communicatively coupled to the depth sensor, the first indicator light, the second indicator light, the third indicator light, and the ambient light sensor; and
a memory device that includes instructions executable by the processing device for causing the processing device to:
receive sensor signals from the depth sensor indicating that the work tool is at various depths and responsively activate a corresponding one of the first indicator light, the second indicator light, or the third indicator light for each depth among the various depths of the work tool; and
control a brightness of the first indicator light, the second indicator light, or the third indicator light based on a sensor signal from the ambient light sensor.

2. The depth guidance system of claim 1, wherein the work vehicle is an excavator and the work tool is a bucket.

3. The depth guidance system of claim 1, wherein the first color is yellow, the second color is green, and the third color is red.

4. The depth guidance system of claim 1, wherein the first indicator light, the second indicator light, and the third indicator light are disposed within an outer housing and collectively form a multi-segment light bar.

5. The depth guidance system of claim 4, wherein:
the first indicator light includes a plurality of light segments configured to illuminate in the first color, the plurality of light segments including (i) a first light segment corresponding to a first depth above the target depth-range, (ii) a second light segment corresponding to a second depth above the target depth-range, and (iii) a third light segment corresponding to a third depth above the target depth-range; and
the memory device further includes instructions executable by the processing device for causing the processing device to receive a plurality of sensor signals from the depth sensor indicating that the work tool is at a plurality of depths above the target depth-range, and responsively activate a corresponding one of the first light segment, the second light segment, or the third light segment for each depth among the plurality of depths of the work tool.

6. The depth guidance system of claim 4, wherein:
the plurality of light segments is a first plurality of light segments;
the second indicator light includes a second plurality of light segments configured to illuminate in the second color, the second plurality of light segments including (i) a fourth light segment corresponding to a first depth within the target depth-range, and (ii) a fifth light segment corresponding to a second depth within the target depth-range; and
the memory device further includes instructions executable by the processing device for causing the processing device to receive another plurality of sensor signals from the depth sensor indicating that the work tool is at another plurality of depths within the target depth-range, and responsively activate a corresponding one of the fourth light segment or the fifth light segment for each depth among the other plurality of depths of the work tool.

7. The depth guidance system of claim 1, wherein the first indicator light, the second indicator light, and the third indicator light are each at least 0.0508 meters in height.

8. A work vehicle comprising:
a cab defined by a frame that includes a plurality of vertical support members for supporting a roof of the cab;
a touch-screen display positioned in the cab;
a light bar positioned in the cab separately from the touch-screen display, the light bar being coupled to a vertical support member among the plurality of vertical support members defining the frame of the cab, wherein the light bar includes:
a first indicator light configured to illuminate in a first color; and
a second indicator light configured to illuminate in a second color that is different from the first color;
a work tool configured to be manipulated using one or more input devices within the cab;
a depth sensor configured to detect a depth of a work tool;
a processing device communicatively coupled to the depth sensor and the light bar; and
a memory device that includes instructions executable by the processing device for causing the processing device to:
receive a first sensor signal from the depth sensor;
determine that the work tool is positioned above a target depth-range based on the first sensor signal and responsively activate the first indicator light;
receive a second sensor signal from the depth sensor; and
determine that the work tool is positioned within the target depth-range based on the second sensor signal and responsively activate the second indicator light.

9. The work vehicle of claim 8, wherein the work vehicle is an excavator, the work tool is a bucket, and the depth sensor is positioned on the bucket.

10. The work vehicle of claim 8, wherein the first color is yellow and the second color is green.

11. The work vehicle of claim 8, wherein:
the vertical support member is an A-Pillar of the cab; and
the light bar is oriented so as to be facing an operator in the cab of the work vehicle.

12. The work vehicle of claim 8, wherein the memory device further includes instructions executable by the processing device for causing the processing device to:
determine that the work tool is positioned at a first depth above the target depth-range and responsively activate a first light segment of the first indicator light;
determine that the work tool is positioned at a second depth above the target depth-range and below the first depth, and responsively activate a second light segment of the first indicator light; and
determine that the work tool is positioned at a third depth above the target depth-range and below the second depth, and responsively activate a third light segment of the first indicator light.

13. The work vehicle of claim 12, wherein the memory device further includes instructions executable by the processing device for causing the processing device to:
determine that the work tool is positioned at a fourth depth within the target depth-range and responsively activate a first light segment of the second indicator light; and
determine that the work tool is positioned at a fifth depth within the target depth-range and below the fourth depth, and responsively activate a second light segment of the second indicator light.

14. The work vehicle of claim 13, wherein the memory device further includes instructions executable by the processing device for causing the processing device to:

determine that the work tool is positioned at a sixth depth below the target depth-range and responsively activate a first light segment of a third indicator light, the third indicator light being configured to illuminate in a third color that is different from the first color and the second color; and determine that the work tool is positioned at a seventh depth below the sixth depth, and responsively activate a second light segment of the third indicator light.

15. The work vehicle of claim 8, wherein the first indicator light and the second indicator light are each at least 0.0508 meters in height.

16. The work vehicle of claim 8, wherein the first indicator light and the second indicator light are each no more than 0.0762 meters in width.

17. A method comprising:

receiving, by a processing device, a first sensor signal from a depth sensor configured to detect a depth of a work tool coupled to a work vehicle;

determining, by the processing device, that the work tool is positioned above a target depth-range based on the first sensor signal and responsively activating a first indicator light of a depth guidance system, the first indicator light being configured to illuminate in a first color indicating that the work tool is above the target depth-range;

receiving, by the processing device, a second sensor signal from the depth sensor;

determining, by the processing device, that the work tool is positioned within the target depth-range based on the second sensor signal and responsively activating a second indicator light of the depth guidance system, the second indicator light being configured to illuminate in a second color indicating that the work tool is within the target depth-range, the second color being different from the first color;

receiving, by the processing device, a sensor signal from an ambient light sensor; and controlling, by the processing device, a brightness of the first indicator light or the second indicator light based on the sensor signal from the ambient light sensor.

18. The method of claim 17, wherein the first indicator light and the second indicator light are coupled to an A-Pillar vertically supporting a roof of a cab of the work vehicle and oriented toward an operator of the work vehicle.

19. The method of claim 17, further comprising receiving the target depth-range as input via a user input device positioned in a cab of the work vehicle.

20. The method of claim 17, further comprising:

determining that the work tool is positioned at a first depth above the target depth-range and responsively activating a first light segment of the first indicator light;

determining that the work tool is positioned at a second depth above the target depth-range and below the first depth, and responsively activating a second light segment of the first indicator light;

determining that the work tool is positioned at a third depth above the target depth-range and below the second depth, and responsively activating a third light segment of the first indicator light; and determining that the work tool is positioned at a fourth depth within the target depth-range and responsively activating the second indicator light.

21. The system of claim 1, wherein the ambient light sensor is configured to detect an amount of ambient light in an environment of the first indicator light, second indicator light, or third indicator light.

22. The method of claim 17, further comprising:

receiving a target depth as user input; and generating the target-depth range by applying a tolerance amount to the target depth.

* * * * *